April 7, 1970   W. R. BUSH ET AL   3,504,716
POWER TOOL AND GUIDE THEREFOR
Filed Dec. 28, 1966   3 Sheets-Sheet 1
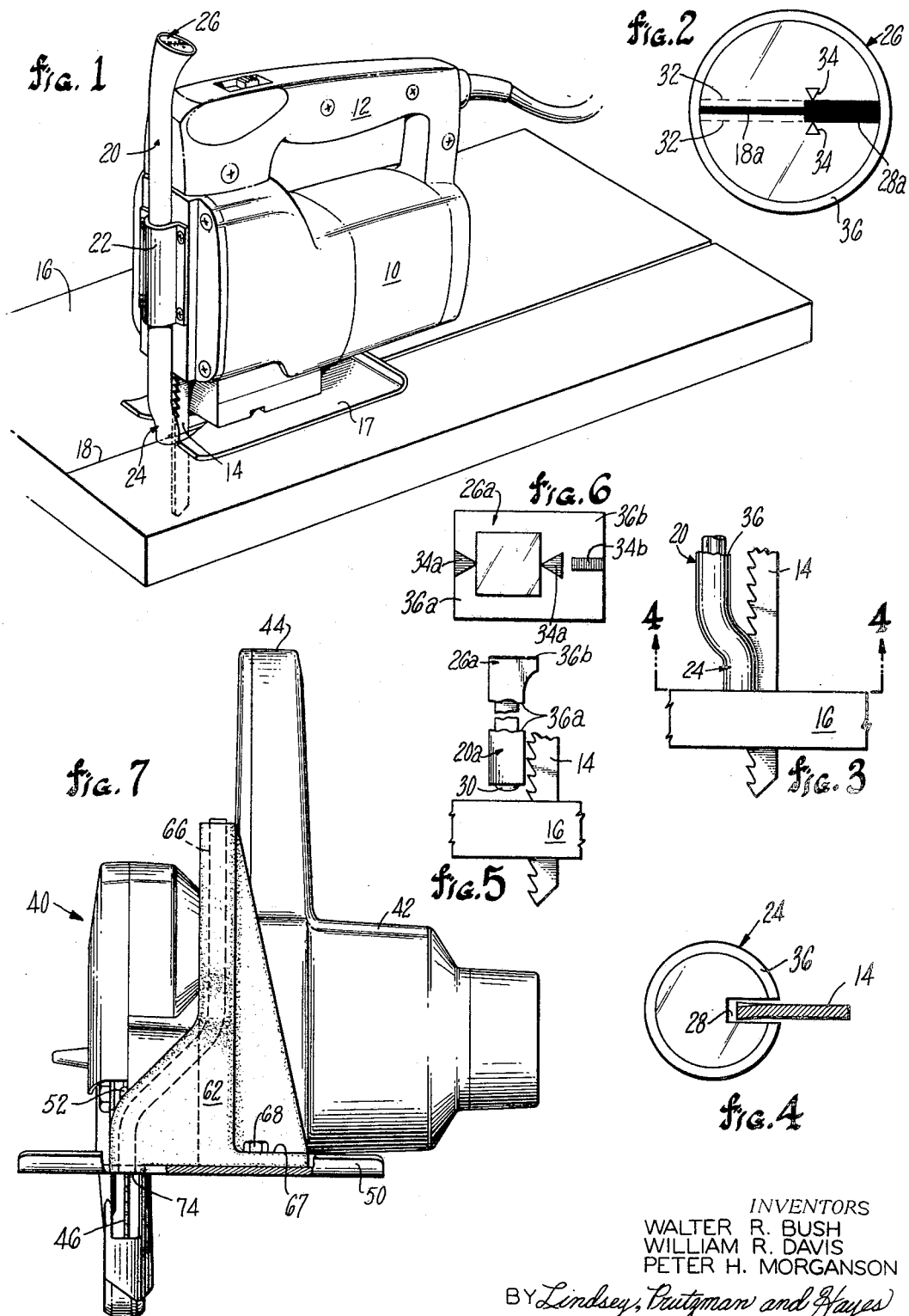
INVENTORS
WALTER R. BUSH
WILLIAM R. DAVIS
PETER H. MORGANSON
BY *Lindsey, Prutzman and Hayes*
ATTORNEYS

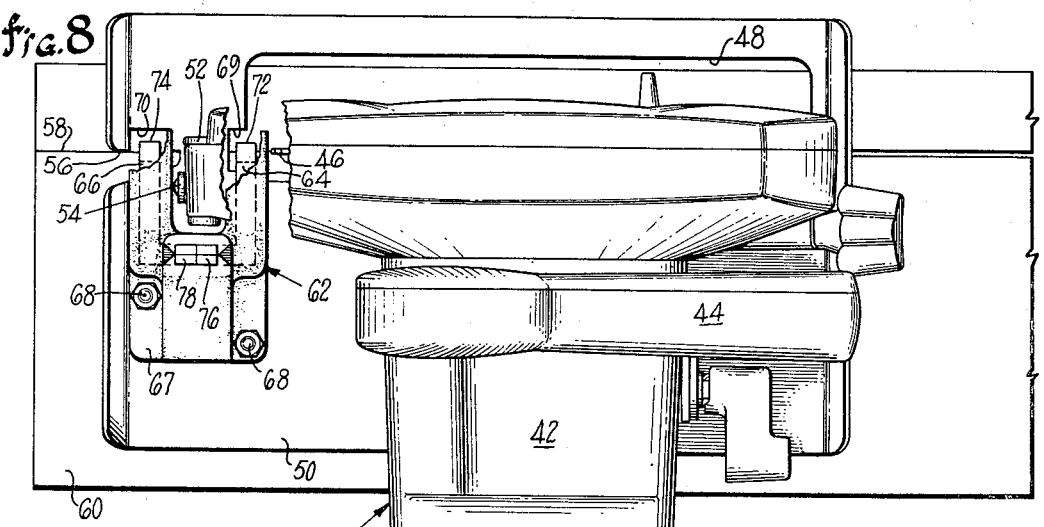
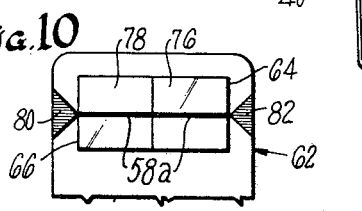
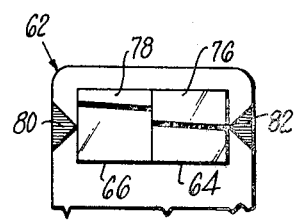
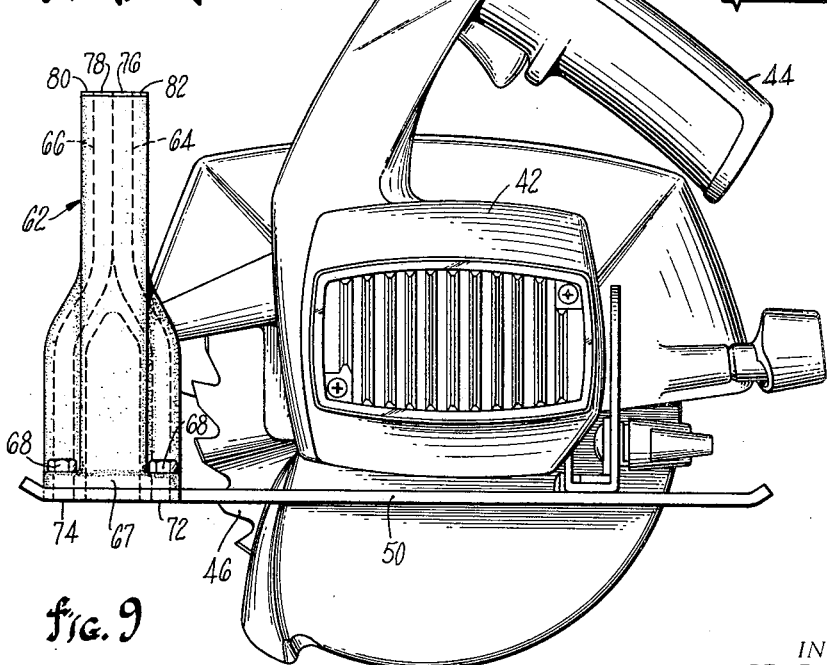

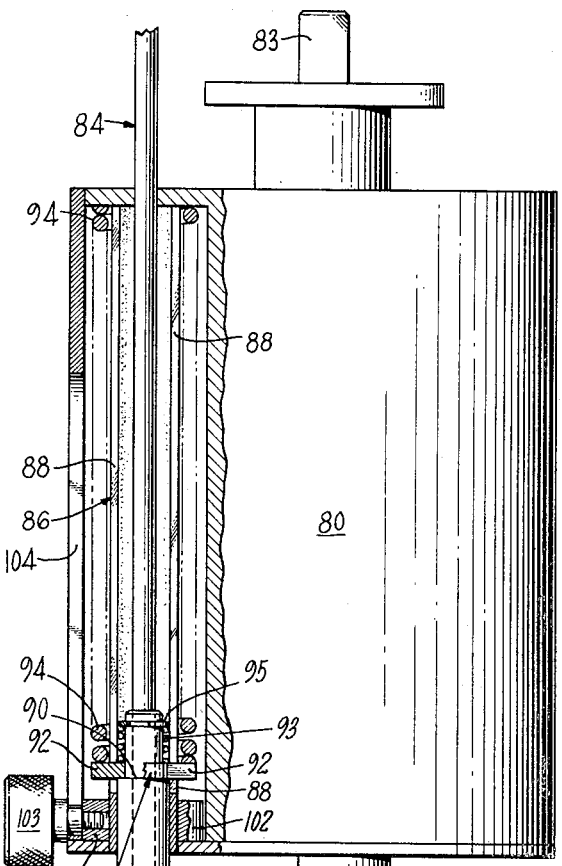
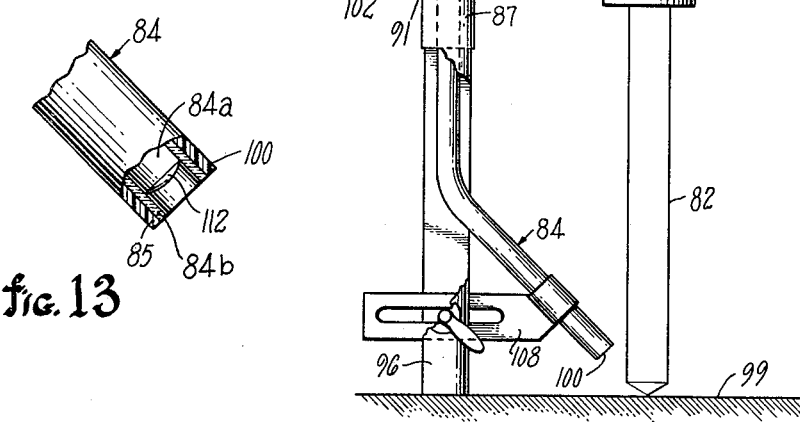

United States Patent Office 3,504,716
Patented Apr. 7, 1970

3,504,716
POWER TOOL AND GUIDE THEREFOR
Walter R. Bush and William R. Davis, West Simsbury, and Peter H. Morganson, Winsted, Conn., assignors to The Stanley Works, New Britain, Conn., a corporation of Connecticut
Filed Dec. 28, 1966, Ser. No. 605,234
Int. Cl. B27b 9/04, 11/02
U.S. Cl. 143—43                                     13 Claims

ABSTRACT OF THE DISCLOSURE

An optical conduit is fixedly mounted on a portable power tool having a terminal device such as a saw blade so that the image pick up end of the conduit is pointed at a line marking the path of travel of the terminal device along a workpiece at a point in advance of the travel of the tool along the workpiece to convey an image of the workpiece so that the user may closely follow and accurately guide the terminal device through the image on the viewing end of the conduit which is disposed conveniently for viewing. The image pick up end of the conduit may be in engagement with the surface of the workpiece, incorporate a focusing lens, be grooved to receive a portion of the terminal device or be bifurcated to provide two spaced ends aligned along the axis of the terminal device to amplify any misalignment of the terminal device from the desired path. The image viewing end may present a magnified image as by the enlargement thereof and may include reference indicia to indicate the relative position of the terminal device to the image being viewed.

---

The present invention primarily relates to power tools and the like and is particularly concerned with the guiding of tools along a desired path.

A principal object of the present invention is to provide a new and improved tool of the type described wherein the portion of the workpiece being acted on by the tool may conveniently be viewed and monitored by the operator.

Another object of the present invention is to provide a new and improved portable tool having optical means for visually conveying the image of the workpiece being acted upon by the tool to a location where it may be conveniently observed by the operator.

Still another object of the present invention is to provide a new and improved power tool incorporating a guide which visually conveys to the user the image of the workpiece along the path of travel of the tool in advance of the tool.

A still further object of the present invention is to provide for an attachment which is mountable on the tool so as to be movable therewith and to convey the image of the workpiece adjacent the point being worked upon to a convenient remote viewing point.

A further object of the present invention is to provide a new and improved saw having a novel guide capable of conveying an image of the workpiece in advance of the saw blade to a convenient viewing point for the user to provide a unique capability to closely and precisely follow a prescribed path.

It is another object of the present invention to provide a new and improved portable tool having a novel locator capable of conveying the image of the portion of the workpiece along the path of travel of the tool prior to the engagement of the tool with that portion of the workpiece.

Other objects will be in part obvious and in part pointed out more in detail hereinafter.

The invention accordingly consists in the features of construction, combination of elements and arrangement of parts which is exemplified in the construction hereafter set forth, and the scope of the invention is indicated in the appended claims.

In the drawing:

FIG. 1 is a perspective view of an illustrative embodiment of the present invention wherein the invention is applied to a saber saw;

FIG. 2 is an enlarged end view of the image viewing end of the guide of the saber saw of FIG. 1;

FIG. 3 is an enlarged fragmentary side view showing the image pickup end of the guide of FIG. 1;

FIG. 4 is an enlarged cross-sectional view taken along the line 4—4 of FIG. 3;

FIG. 5 is a fragmentary view generally similar to FIG. 3 showing an alternative form of a guide suitable for use with the saber saw of FIG. 1;

FIG. 6 is an enlarged end view of the image viewing end of the guide of FIG. 5;

FIGS. 7, 8 and 9 are front, top and side views, respectively, of another illustrative embodiment of the present invention wherein the invention is applied to a portable power saw;

FIG. 10 is an enlarged view of the image viewing end of the guide of FIG. 8 illustrating the image of a marking line defining the desired path across a workpiece when the saw is properly following the line;

FIG. 11 is a view similar to FIG. 8 showing the visual image of the marking line conveyed to the user under one condition of misalignment of the saw with the workpiece;

FIG. 12 is a side view, partially broken away, schematically illustrating another embodiment of the invention associated with a drill; and FIG. 13 is an enlarged fragmentary view, partially broken away, showing an image pickup end of a guide suitable for use with a tool such as shown in FIG. 10.

Referring now to the drawings in greater detail wherein like reference numerals indicate like parts throughout the several figures, there is shown in FIG. 1, for the purpose of illustrating the invention, an exemplary portable electric saber saw having a motor housing 10 and handle 12. The saber saw is provided with a saw blade 14 of a conventional type which reciprocates as the saw glides across a workpiece such as board 16 on a supporting shoe 17 to cut the workpiece along a straight or curved line 18.

It is necessary that the operator continuously monitor the position of blade 14 to maintain it coincident with line 18 in order to cut the workpiece 16 along the desired path of travel. Heretofore, the problem of following the desired path of travel has not had a satisfactory solution since the position of the operator relative to the saw blade 14 has made it substantially impossible to continuously view the alignment of the blade with the line 18, particularly since the operator had to assume an awkward and unnatural position laterally of the path of travel in order to view the saw blade. The present invention provides a complete solution to this problem and makes it possible for a portable saber saw to follow the intended path of travel with an accuracy heretofore solely within the capability of bench tools.

As illustrated in FIG. 1, a guide, or locator, 20 is mounted on the saw by any suitable means such as clamp 22 which removably secures the guide to the housing 10 in the desired adjusted position. The guide 20 comprises an image transmitting conduit having its image pickup end 24 positioned in alignment with saw blade 14 so as to precede the blade along its path of travel as defined by straight or curved line 18. The image pickup end 24 is positioned adjacent to the workpiece 16 so as to pick up the image of the line 18 which is transmitted through the guide 20 and presented on the image viewing end 26 of the guide 20 which may be located for convenient viewing by the user in any desired position.

In the embodiment of the invention illustrated in FIGS. 1, 3 and 4, the lower end of the image transmitting conduit 20 is shown as being in contact with the surface of workpiece 16 and provided with a reversely bent end portion which is grooved at 28 to receive saw blade 14. This arrangement has the advantage of assuring that the blade 14 and the guide 20 are properly aligned and further provides for the viewing of the intended path of travel of the blade represented by line 18 at a location substantially at the cutting edge of the blade. Such a feature is particularly desirable where the marker line 18 is curved since it enables the operator to align the blade with the line substantially at the point of cutting.

As shown in FIG. 1, the image viewing end 26 of the guide 20 may be enlarged to magnify the image presented to the operator. It should be understood, however, that this optional feature is not essential to the present invention in its broadest aspects.

FIG. 2 illustrates the image which is presented by the image viewing end 26 of the guide 20. The groove 28 of the image pickup end 24 of the guide 20 will exhibit a contrasting area 28a which may be visually perceived as indicated in FIG. 2. Since the blade 14 is positioned in the groove 28, the position of the saw blade is indiacted by the area 28a and its alignment with the image 18a of the line 18 may be accurately and continuously monitored. If desired, the image viewing end 26 of the guide 20 may be provided with one or more fixed reference lines 32 so that by appropriate positioning of the image 18a of the marker line 18 relative to the reference lines 32 a high degree of accuracy of alignment may be obtained. Moreover, further locating indicia such as carets 32 may be provided to indicate the cutting edge of the teeth of the blade 14. This is particularly useful in cutting scrolls or along a curved path or when cutting a kerf which terminates short of severing the workpiece since the carets 32 will visually indicate the location of the cutting edge of the blade 14.

FIGS. 5 and 6 illustrate a modified form of the guide of this invention wherein the guide is shown as being of noncircular cross section. In this alternative embodiment, the image pickup end portion 20a is not grooved and is spaced from the surface of the workpiece 16. Focusing means such as lens 30 of any suitable type is shown as being provided for the pickup of a sharp image of the marker line 18. In this embodiment, the sheath 36a surrounding the image viewing end 26a of the guide may be provided with a trailing extension 36b and with locating indicia such as carets 34a, and reference line 34b to represent the location of the cutting edge of blade 14.

An image transmitting conduit suitable for use as the guide 20 in the practice of this invention may be formed by a bundle of a multiplicity of optically distinct fibers of small diameter and comprising highly transparent glass or plastic cores coated with a glass or plastic covering of lower refractive index. The ends of the bundles of fibers are secured or bonded together so that the individual fibers at the two ends have a similar placement relative to each other to produce at one end the image picked up at the other. Such an image transmitting conduit may be sheathed in a protective covering such as covering 36 (FIG. 2) of any suitable material as, for example, an epoxy resin. The bundle of fibers forming the image transmitting conduit may be of any desired cross section such as round (FIG. 1) or square (FIG. 6) and may be made rigid such as in the illustrated embodiment of the invention represented by FIG. 1 by bonding the fibers together throughout their length or remain flexible by bonding the fibers only at their ends.

FIGS. 7 through 11 illustrate the application of the invention to a portable electric power unit wherein the terminal device is a circular saw blade. The portable power unit generally indicated by the numeral 40 includes a housing 42 and a handle 44 for manipulating the tool. The portable power unit 40 is shown as driving a circular saw blade 46 which extends through a slot 48 in a shoe 50, the shoe 50 being supported for pivotal movement about a pivot 52 to control the depth of cut by controlling the amount the blade extends below the shoe 50. The supporting structure for the shoe 50 also includes a second pivot 54 disposed at right angles to pivot 52 to adjust the angle of the blade 46 with respect to the shoe 50 for making bevel cuts of the desired angle.

The shoe 50 may, if desired, be provided with an aligning edge 56 which, in the conventional portable saw, is used to visually follow the marker line 58 on the workpiece 60.

In the embodiment of the invention represented by FIGS. 7 through 11, the guide 62 is mounted on the shoe 50. The guide 62 is formed of a pair of image transmitting conduits 64, 66 which are positioned in abutting relationship at the image viewing ends 76, 78 but are branched or bifurcated at their image pickup ends 72, 74. The guide 62 is shown as having a cast supporting structure encasing the pair of image transmitting conduits 64, 66. The cast supporting structure also provides a base 67 for receiving studs 68 to secure the guide 62 to the shoe 50 with the image pickup ends 72, 74 positioned in notches 69, 70 of the shoe 50. The faces of image pickup ends 72, 74 are disposed substantially in the plane of the lower surface of the shoe 50 and in alignment with saw blade 46 so as to precede the same along its path of travel relative to the workpiece 60. If desired, carets 80, 82 or other fixed or adjustable reference points or lines may be provided on the viewing end of the guide 62.

Since the image pickup ends 72, 74 and the saw blade 46 are positioned in alignment, it will be apparent that the image of the marker line 58 presented at the image viewing end of guide 62 will form an unbroken straight line when the saw is cutting a kerg along or parallel to line 58. Moreover, if the image pickup ends 72, 74 are centered on the center line of the saw blade 46, the image 58a of the line 58 will appear as an unbroken line centered in the field of view of the image viewing ends 76, 78 of image transmitting conduits 64, 66, respectively. FIG. 10 illustrates the image 58a presented under such conditions.

FIG. 11 illustrates the image of the line 58 presented when the saw is cutting a kerf at an angle with respect to marker line 58. Under such a circumstance, the image of the line 58 presented at the viewing end of guide 62 will comprise a pair of broken or offset lines. A special advantage of spacing the image pickup ends 72, 74 of the light transmitting conduits 64, 66 is that the amount of offset between the images of the line 58 presented by the viewing ends 76 and 78 of the guide 62 will be amplified so that the line 58 may be followed with great accuracy.

Since the guide 62 is mounted on the shoe 50, it will also be apparent that it will be maintained in alignment with saw blade 46 regardless of the depth of cut or the bevel angle for which the shoe 50 is adjusted.

FIGS. 12 and 13 illustrate another embodiment wherein the invention is shown as being applied to a power unit for an axially movable tool such as a drill bit. In this embodiment, the power unit is shown as having a housing 80 and a drill bit 82 extending from one end thereof. A shaft 83 is shown as being provided at the other end of the housing for receiving input power from, say, a flexible shaft (not shown). A guide 84 is shown as having a protective outer sheath 85 of the type hereinbefore described and as being mounted for relative axial movement in a slotted tube 86 within housing 80. A tubular support 87 fixed to sheath 85 is provided with a shoulder or abutment 90 on which a washer 91 is seated. Washer 91 provides a pair of tabs 92 extending through the slots of the tube 86 and may be axially fixed relative to support 87 by spring 93 and ring 95 which may be seated in a groove in the support 87. The tabs 92 serve as a spring seat for biasing spring 94 which resiliently biases the support 87 downwardly.

The support 87 is further provided with a bifurcated leg 96 which engages the workpiece being acted on so that as the drill moves axially relative to the workpiece, the guide, or locator, 84 is maintained at a fixed position with respect to the workpiece. FIG. 12 illustrates this embodiment of the invention at the time the drill bit 82 engages the workpiece 99. At this time, the tabs 92 of the washer 91 have been urged away from the bottoms of the slots 88 of the tube 86 against the bias of spring 94 by the engagement of the leg 96 with the workpiece 99. It will therefore be apparent that if the image pickup end is focused on the workpiece at the point to be engaged by the drill when the guide support leg 96 engages the workpiece 99 but just before the drill bit 82 engages the workpiece 99, the drill may be accurately located relative to the workpiece despite the fact that the portion of the workpiece to be drilled cannot be seen directly by the operator. If desired, a clamping ring 102 may be provided to limit the downward movement of washer 91 and guide 84 to an amount, say, slightly greater than the extension of drill bit 82. Clamping screw 103 is shown as being positioned in slot 104 of housing 80 to clamp ring 102 in adjusted position. In this manner, the invention conveniently accommodates drill bits or other termial devices of varying lengths.

The invention as illustrated in FIG. 12 includes a guide or locator 84 which is provided with at least a section adjacent the pickup end 100 thereof which is flexible so that the image pickup end may be held by an adjusting clamp 108 at an adjustable angle with respect to the axis of the support leg 96 so as to focus the image pickup end 100 on the workpiece at a point along the axis of the drill bit 82 just prior to the time the bit 82 engages the workpiece 99.

The embodiment of the invention illustrated in FIGS. 12 and 13 includes another variation for making the invention especially adaptable for use under poor light conditions. Referring primarily to FIG. 13, the guide 84 comprises two separate light transmitting conduits. Conduit 84a is provided for transmitting the image from the image pickup end 100 to the image viewing end remote therefrom and conduit 84b which is shown as being concentrically disposed around conduit 84a, but optically isolated therefrom, to transmit light to the image pickup end of the guide 100 to illuminate the portion of the workpiece being acted on. A focusing lens 112 is provided as in the embodiment of FIG. 5 and the conduit 84b which conducts the light to the workpiece is shown as projecting beyond the focusing lens 112 to shield the image pickup end of conduit 84a and lens 112 from direct illumination by the light delivered by conduit 84b.

From the foregoing, it will be apparent that this invention can be applied to power tools for operating any terminal device such as portable saws, drills and nut runners, for example, to provide a conveniently located image of a marked line, or other indication of a desired path of travel of a terminal device, as it moves relative to a workpiece. It will also be apparent that this invention makes it possible for a portable tool to perform with an accuracy heretofore solely within the capability of bench tools.

As will be apparent to persons skilled in the art, various modifications and adaptations of the structure above-described will become readily apparent without departure from the spirit and scope of the invention, the scope of which is defined in the appended claims.

What is claimed is:

1. A portable power unit mounting a saw blade and including a supporting base for supporting the power unit on a workpiece for movement thereacross with the blade spanning the supporting base, an image transmitting conduit means mounted by the power unit to provide a precise visual guide to direct the saw blade along a prescribed path across the workpiece, said image transmitting conduit means having its image pick-up end portion positioned to point through the plane of the supporting base to pick-up the image of the workpiece in the plane of the blade and in advance thereof along its path of travel.

2. The device of claim 1 wherein the image transmitting conduit means is provided with a viewing and remote from said saw blade and pointed toward the operator.

3. The device of claim 2 wherein the viewing end of the image transmitting conduit means is provided with reference indicia correlated with the position of the saw blade and its path of travel in advance thereof.

4. The device of claim 1 wherein said image transmitting conduit means comprises a bundle of light transmitting optically independent oriented fibers.

5. The device of claim 1 wherein said image transmitting conduit means comprises a bundle of light transmitting optically independent fibers and the image pick-up end thereof is provided with a focusing lens for picking up the image of said workpiece while being spaced therefrom.

6. The device of claim 1 wherein the image pickup end of said conduit means is grooved to receive the cutting edge of said saw blade.

7. The device of claim 1 wherein said conduit means comprises a pair of image transmitting conduits with the image pickup ends thereof being spaced apart and aligned with the saw blade along its path of travel relative to the workpiece.

8. The device of claim 1 wherein the supporting base is an adjustable shoe and the conduit means is mounted on said shoe for movement therewith.

9. The device of claim 1 wherein said conduit means comprises a pair of image pickup conduits.

10. The device of claim 9 wherein the image pickup ends of said pair of conduits are both aligned with and precede said saw blade along its path of travel and are spaced apart relative to each other.

11. The device of claim 10 wherein the image viewing ends of said pair of conduit are positioned in abutting relationship.

12. A guide attachment for a portable power unit mounting a saw blade and including a supporting base for supporting the power unit on a workpiece for movement thereacross with a blade spanning the supporting base, said guide attachment comprising an image transmitting conduit and means for mounting the conduit on the power unit with its image pick-up end portion positioned to point through the plane of the supporting base to pick-up the image of the workpiece in the plane of the blade and in advance thereof along its path of travel and with its image viewing end pointed toward the operator.

13. The device of claim 1 wherein the image pick-up end portion of said image transmitting conduit means is positioned in the plane of the supporting base for contacting the workpiece.

References Cited

UNITED STATES PATENTS

| | | | |
|---|---|---|---|
| 1,753,959 | 4/1930 | Wikstrom | 143—157 |
| 2,227,727 | 1/1941 | Leggiadro | 128—6 |
| 1,630,659 | 5/1927 | Hacker | 83—520 X |
| 3,091,235 | 5/1963 | Richards | 350—96 X |
| 3,205,738 | 9/1965 | Ballmer et al. | 83—521 X |

FOREIGN PATENTS 165,464   3/1964   Germany.

DONALD R. SCHRAN, Primary Examiner

U.S. Cl. X.R.

77—5; 143—68